United States Patent Office 3,527,895
Patented Sept. 8, 1970

3,527,895

LOAD AVERAGING ARRANGEMENT FOR TELEPHONE SWITCHING SYSTEMS

Norbert Bininda, Munich-Solln, Germany, assignor to Siemens Aktiengesellschaft, Erlangen, Germany, a corporation of Germany Filed Apr. 8, 1966, Ser. No. 541,166
Claims priority, application Germany, Apr. 23, 1965, S 96,706
Int. Cl. H04q 3/68
U.S. Cl. 179—18 5 Claims

ABSTRACT OF THE DISCLOSURE

An exchange connection network for telephone systems for conformation of the actual traffic load to the traffic load capacity without a mixture of different types of traffic between coupling stages. Rather, the various types of input and output means, such as subscriber lines, relay sets, registers, etc., are connected in mixed fashion to the switching network, so that the effective traffic load is averaged out and is brought to a value conforming to the traffic load capacity of the switching network. If necessary for this purpose, some of the inlets and outlets of the switching network are left unconnected.

Figure 1:
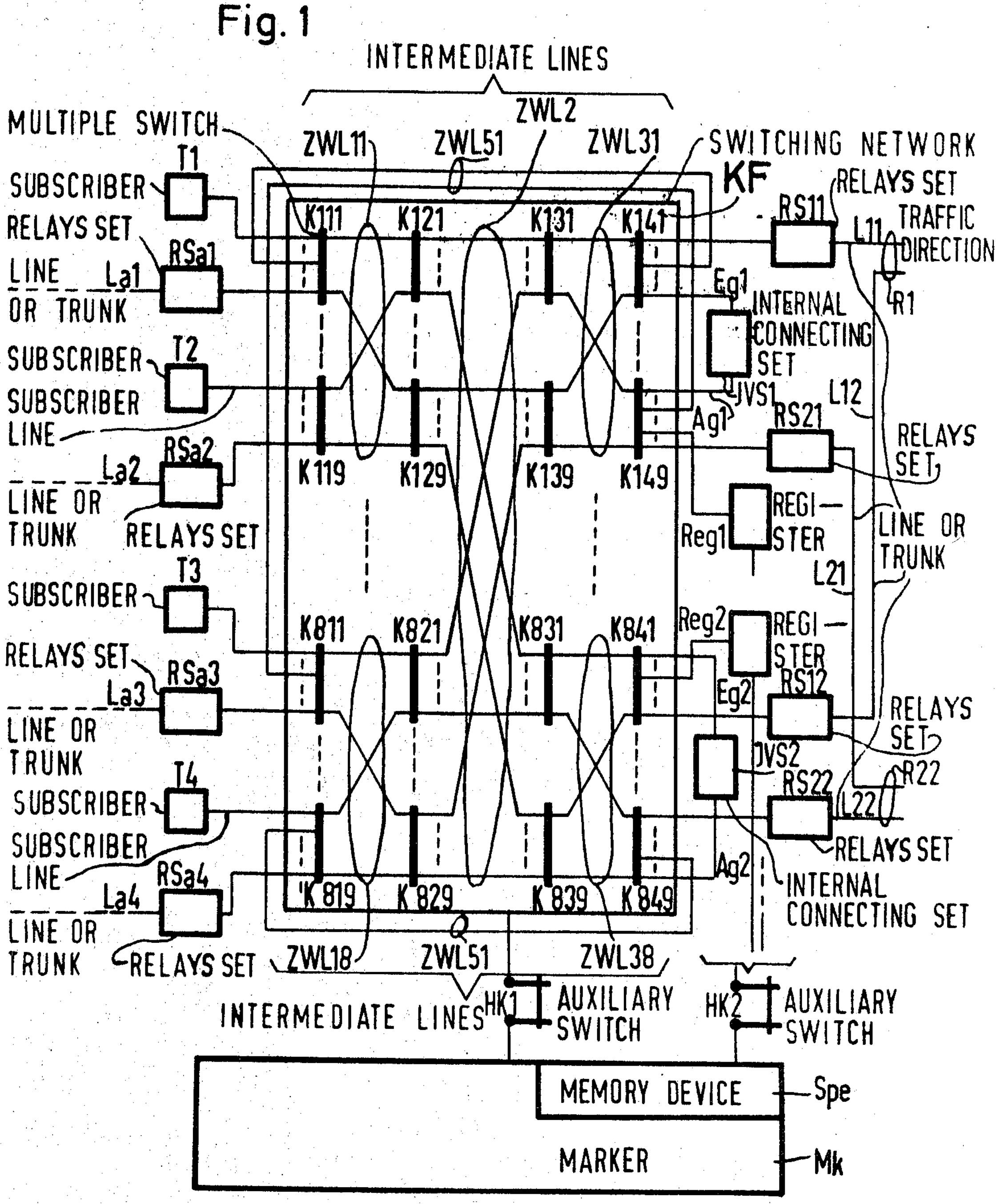

This invention relates to Bininda et al. application Ser. No. 443,242 filed on Mar. 29, 1965, and now abandoned, entitled, "Arrangement for Long-Distance Communication Exchange Installations, in particular, Telephone Exchange Installation," Ser. No. 537,980, Bininda et al., filed on Mar. 28, 1966, and now Pat. No. 3,491,211, bearing the same title. These two applications are expressly incorporated herein.

INTRODUCTION

The present invention relates to circuit arrangements for communication systems and, more particularly, to telephone communication systems comprising an exchange switching field such as a switching network including a plurality of switching stages interconnected with each other by intermediate lines (links).

STATE OF THE PRIOR ART

In the past it has been known to use switching network in such systems as exchange switching fields. A switching network comprises a number of individual sets of multiple switches of which each represents a coordinate arrangement built in the manner of a matrix. Each multiple switch has a number of inputs and outputs which are interconnectable therein in a variety of combinations. For the purpose of this description the multiple switch comprises first inner lines which individually correspond to the multiple switch inputs, and second inner lines which individually correspond to the multiple switch outputs. The first and second inner lines cross each other to form crosspoints of the coordinate arrangement (matrix). Each crosspoint includes a switching relay whose contacts connect the respective first and second line with each other.

These multiple switches are arranged in a switching network in several switching stages. The outputs of the multiple switches of each switching stage are permanently interconnected by intermediate lines (links) to the inputs of the succeeding stage. For effecting such interconnections a number of schemes are known in the art. The inputs of the first switching stage are the input means of the switching network and the outputs of the last switching stage are the output means of the switching network. In this connection, the terms "input means" and "output means" are used hereinafter where the entire switching network is involved; whereas, the terms "inputs" and "outputs" are used in reference to the individual multiple switches within the switching network. It is to be understood that the "inputs" of the first switching stage are also the "input means" of the switching network. The same applies to the outputs.

With regard to the number of switching stages, multiple switches in each switching stage, crosspoints, inputs and outputs of each multiple switch, intermediate lines (links), and with regard to the interconnection by grading of several inputs or outputs of multiple switches of respectively equal switching stages to a respective single intermediate line (link), it is conventional to design such switching networks so that incoming traffic which reaches the switching network through offering lines connected to the input means and output means of the switching network, fully loads the switching field. Offering lines as used herein are such lines through which the traffic reaches the coupling field, for example, incoming connecting lines.

In designing the switching network, an intended traffic load for the switching network is determined which results from the maximum, permissible percentage of connections which are lost because of internal congestion (busy routes). It is possible to achieve either a so-called thinning out of traffic (low traffic load or density) or a so-called concentration of traffic (high traffic load or density) either by using, respectively, a layout of the multiple switches with many inputs and few outputs and vice versa, or by connecting one output of each of several multiple switches (or of one multiple switch) to an input of a multiple switch (or to one input of each of several multiple switches) of a succeeding switching stage. When a multiple switch with many (or few) inputs and few (or many) ouputs is used, then it is possible to concentrate (or dilute) the traffic load, if—as is assumed—the feeding lines are connected to the inputs. The traffic load from one switching stage to the other can also be concentrated (or thinned) by permanently connecting one output of each of several multiple switches (or of one multiple switch) through a single intermediate line (link) to one, input of a multiple switch (or to one input of each of several multiple switches). Such measures are also referred to as grading.

In most instances it is necessary to adapt or match the traffic load of the offering lines to the traffic load capacity of a switching network. For example, if the offering lines are subscriber lines, their traffic load is several times lower than the utilization limit of switching networks.

In known systems such adaptation or matching is achieved by the type of grading described above. Accordingly, such grading is accomplished in wiring between two switching stages. For this purpose a special distribution frame for grading purposes is provided which permits the varying of the grading scheme at any time. However, such a distribution frame involves an extra expense, and in addition it disturbs the homogeneity of the switching network, the multiple switches and the intermediate lines (links) of which (were it not for the distribution frame) could be built in a compact, uniform or standard manner.

More particularly, a distribution frame for grading purposes is also undesirable if a path seeking network, comprising contacts of intermediate line relays, is provided for controlling the switching network. Such a path seeking network is arranged similarly to the talking path network, indeed similarly to the intermediate line network, but it is separately built because the multiple switches in such a system are being bypassed by the path seeking network. Accordingly, for changing the grading scheme it is always necessary to effect changes in two places and this is a constant source of possible errors.

Furthermore, such changes differ from each other, and cause particular difficulties or problems, if for each intermediate line, one intermediate line relay, one decoupling semiconductor and so on, is required and if, due to the grading scheme, the number of necessary intermediate lines is increased. Finally, distribution frames complicate the methods of path seeking because, due to such grading schemes, a constant switching network structure cannot be assumed in developing such methods. On the contrary, the grading in this respect is an unknown variable.

OBJECTS

Accordingly, it is the primary object of the invention to overcome the above-described drawbacks of prior art communication devices.

Another object of the invention is to provide lines for connecting to the inputs and outputs of a switching network, for various purposes, such as, subscriber lines, incoming or outgoing local connection lines or trunks and long distance trunks, or inputs and outputs of relay sets.

A further object of the invention is to employ a uniform or standard exchange switching network for making any type of connection.

Another object of the invention is to avoid a grading scheme for traffic concentration with regard to subscriber lines.

Still another object of the invention is to provide a traffic load for the exchange switching network which is achieved by a respective wiring or loading of the input and output means of the exchange switching network with heavy-load and light-load circuit means, such as trunks and subscriber circuits.

Another object of the invention is to provide a precise matching of the traffic load of the input means and output means of an exchange switching network to the traffic load capacity of such a network.

The above objects have been accomplished according to the invention, by providing fixed intermediate line connections between the switching stages of an exchange switching network, thus removing the grading from the internal structure of an exchange switching network, and employing mixing outside of the exchange switching network, and more particularly, by connecting circuit means of all kinds, e.g., incoming and outgoing trunks, incoming and outgoing local lines, subscriber lines, registers, relay sets, to input and output means of the exchange switching network in a mixed fashion.

More particularly, the invention comprises an exchange switching network, any input means of which are connectable, without exception, in a known manner to any output means thereof. The outputs of the switch means of each of the switching stages are connected to the inputs of the switch means of the respective, succeeding switching stage. Also, due to a mixed loading or wiring of circuit means to the input means and to the output means of the exchange switching network, groups and subgroups of said input means and groups and subgroups of said output means have, relative to each other, an equal traffic load which is matched to the traffic load capacity of the entire exchange switching network. The input means are connected, for example, to subscriber lines and incoming connection lines; and the output means are connected, for example, to outgoing connection lines, to inputs and outputs of internal connecting sets and registers for receiving dialing information. The groups of input means or output means are, for example, the respective inputs of a multiple switch of the first and the outputs of a multiple switch of the last switching stage. Such lines are connected to the input means and output means in a mixing fashion.

The invention also makes it possible to connect, to the outputs of a switching network, lines and switch means for varying purposes, for example, outgoing local connection lines, long distance trunks, inputs and outputs of relay sets through which are interconnected subscribers who are connected to the same switching network, and inputs and outputs of relay sets through which subscribers can be connected to incoming local connection lines and to long distance trunks.

According to a further embodiment of the invention, portions of the inputs and outputs means are wired to or loaded with lines or switch means while the remainder is unwired. In this embodiment the ratio between the wired portion and all input means or output means is equal or substantially equal to the ratio between the traffic load capacity of all input means or output means of the switching network and the actual traffic load of the circuit means, such as lines and/or switch means, connected to the input means or to the output means. This permits a precise adaptation of the actual traffic loads to the traffic load capacity of the exchange switching network.

Yet another embodiment of the invention comprises a first number or portion of input means or output means connected to circuit means such as lines and/or switching means, and a second number or portion of input means or output means of which at least one output is individually connected to one input of said second input means, said first portion being designed so that the traffic load capacity exceeds the traffic load capacity corresponding to a given loss, by an amount corresponding to an additional traffic load capacity which is achieved by interconnecting in pairs the second input and output means. This embodiment permits an optimum utilization of the exchange switching network because the traffic load capacity can be increased by said interconnection in pairs of input means and output means which with due regard to the upper limit of the traffic load capacity of the exchange switching network cannot be connected to lines. By such interconnection in pairs of inputs and outputs, overflow connections are accommodated in that, for example, an interconnection between a subscriber line connected to an input means and a long distance connection line connected to an output means, passes twice through the exchange switching network.

DRAWINGS

Figure 2:
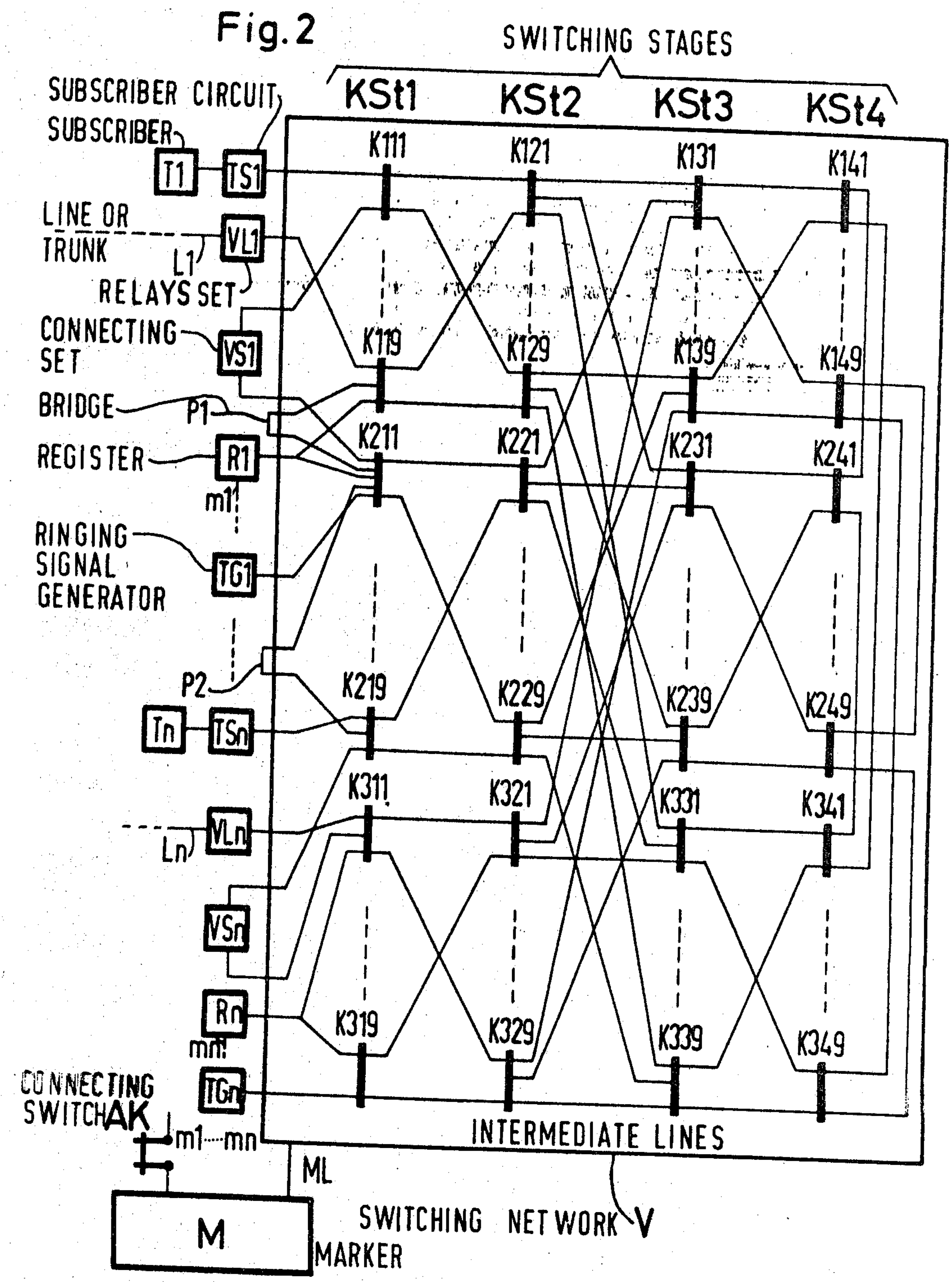

The invention will now be more fully described in conjunction with an operative embodiment thereof shown in the accompanying drawings wherein:

FIG. 1 shows a switching network to the input means of which are connected subscriber circuits (T1 to T4) and incoming lines, and to the output means of which are connected outgoing lines as well as two-way traffic lines, internal connecting sets and dialing information receiving registers; and FIG. 2 shows a switching network to which are connected all of the above mentioned lines as well as subscriber registers and dialing information receiving registers connected to the input means of the switching network.

DESCRIPTION OF INVENTION

Referring to FIGS. 1 and 2, there are shown circuit arrangements each of which comprises a four stage switching network. Each stage includes multiple switches which have a number of inputs and outputs. Only the first and last inputs are shown. Individual lines of a first and second type are assigned to the inputs and outputs within the multiple switch. Such lines form a cross net or matrix having crosspoints. A relay is connected to each crosspoint. The contacts of such relays permit connecting a line of said first type corresponding to an input, to a line of said second type corresponding to an output. The lines form a coordinate cross net having as many switching relays as crosspoints.

In FIG. 1 there is shown a four stage switching network referred to generally as KF. The first switching stage includes multiple switches K111 to K819; the second switching stage includes multiple switches K121 to K829; the third switching stage includes multiple switches K131 to K839; and the fourth switching stage includes multiple switches K141 to K849. The multiple switches of the first two and of the last two stages are combined in groups coupling. Thus, multiple switches K111, K121, K119, K129 and the intermediate additional multiple switches (not shown) form a group (upper-left). The same applies to multiple switches K121, K131, K139, and K149, (upper-right), etc. Within each group each multiple switch (for example, of the first switching stage) is connected to each multiple switch of the second switching stage. Accordingly, the switches of the first stage have as many outputs as there are multiple switch in the second switching stage of the same group. The outputs of the multiple switch K111 and K119 (of the upper-left group) of the first switching stage are connected individually through intermediate lines ZWL11 to the inputs of the multiple switches K121 and K129 of the second switching stage. Likewise, the first and second stage couplers of the lower-left group are interconnected through intermediate lines ZWL18; the third and fourth stage switches of the upper-right group are interconnected through single intermediate lines ZWL31 and the third and fourth stage switches of the lower-right group are interconnected through intermediate lines ZWL38.

The multiple switches K121, K129, K821, K829 of the second switching stage are interconnected with switches K131, K139, K831, K839 of the third switching stage through intermediate lines ZWL2. All outputs of a switch of the second switching stage are individually connected through single intermediates lines with single inputs of one switch of the third switching stage. In this manner, each switch of a switching group of the first (or last) two switching stages at any given time has access to a respective multiple switch of another switching group of the last (or first) two switching stages.

In FIG. 1 there is shown a plurality of switches, groups of switches and intermediate lines, the arrangement of which makes it possible for any output means of the exchange switching network KF (such output means being represented by outputs of switches of the last switching stage K141 to K849) to be reached from or connected to any input means of the exchange switching network (such input means being represented by inputs of switches of the first switching stage K111 to K819). For establishing such connections a plurality of intermediate lines and switches are available at any one time, as is evident from FIG. 1.

A number of subscribers designated T1 to T4 are connected to the input means of the exchange switching network KF shown in FIG. 1 through subscriber lines, unnumbered, and through subscriber circuits (not shown). Connection lines or trunks *La*1 to *La*4 are connected to the input means of the network *Kf* through respective relay sets RS*a*1 to RS*a*4 (line repeaters). A plurality of outgoing or two way connection lines or trunks L11, L12, L21 and L22 are connected by respective relay sets RS11, RS12, RS21 and RS22 to the output means of the exchange switching network KF.

Also connected to the output means of the network KF are inputs E*g*1 and E*g*2 and outputs A*g*1 and A*g*2 of internal connecting sets JVS1 and JVS2, respectively. Connections between subscribers of this same exchange switching network KF are made through these internal connecting sets JVS1 and JVS2. A pair of dialing information receiving registers R*eg*1 and R*eg*2 are also connected to output means of the network KF. The number of all aforementioned circuit means within and outside of the exchange switching network KF is determined in accordance with the respective existing traffic conditions.

It should be emphasized that in accordance with the invention all circuit means such as the lines and the switch means are connected to the input means of the switching network in a mixed arrangement. Similarly, all the circuit means which are connected to the output means are connected in a mixed arrangement. This is of substantial significance with regard to the traffic load of the individual input means and output means of the exchange switching network KF. The traffic load of the various types of lines and switch means or members varies in magnitude. For example, the traffic load of a connection line or trunk (*La*1 to *La*4) is ten times as high as that of an ordinary subscriber's lines (T1 to T4). Further, the traffic load of dialing information receiving registers (R*eg*1 and R*eg*2) is frequently even higher than that of the connection lines. Each type of line and switch member which is connected to the exchange switching network KF has its own specific or characteristic traffic load. Accordingly, grading was customary between two specific exchange switching stages in conventional exchange systems, for example, between the second and third switching stages. The intermediate line wiring included for this purpose a distribution frame wherein inputs of the third switching stage and outputs of the second switching stage were interconnected in such a manner that either a plurality of said inputs or a plurality of said outputs were interconnected with a single output or with a single input. Such grading served to match or adjust the traffic load of the individual types of lines and switch means to the traffic load capacity of the exchange switching network. The instant invention obviates the need for such grading (within the switching network) in the intermediate line wiring between two switching stages, since, due to the mixed connection of the various types of lines and switch means to the input means and the output means of each multiple switch of the first or last switching stage, each switch carries an equal load.

Some of the input means and output means of the switching network KF are directly connected with each other in pairs by plurality of lines ZWL51. This feature permits still further increase in the traffic load capability of a switching network. Due to technical aspects of manufacturing switching networks they are not manufactured for a particular traffic load capability, but are produced in various standard models. For each particular application a model is selected which has a traffic load capability just above the required capability. Some of the input means and output means of the switching network may remain unused in order to closely match the actual traffic load to the traffic load capability. For this purpose the ratio of the number of used input means and output means to the total number of input means and output means should be equal to the ratio between the traffic load capability of the switching network and the actual traffic load occurring in the exchange system.

According to a further embodiment of the invention it is possible to increase still further the proportion of input means and output means of the switching network which are connectable to circuit means such as lines and switch means. The resulting increased traffic load is compensated for by an increase in the traffic load capability of the coupling field by means of the lines ZWL51. These lines decrease the probability of a loss because of internal congestion in the switching network which means that the traffic load capability of the switching network KF can be increased by providing the lines ZWL51.

The circuit arrangement shown in FIG. 1 makes possible a wide variety of connections through a coupling field, such as, internal connections between subscribers of the same exchange system, outgoing and incoming local, as well as long distance, connections, so-called external connections, or local and long distance through connections.

OPERATION

The connections are made by means of the registers of R*eg*1 and R*eg*2, a storage or memory device S*pe*, and a marker M*k*. A more detailed description of these devices is included in the above referred to applications. Outgoing calling subscribers T1 to T4 and the incoming busy connection lines *La*1 to *La*4 are first connected to one of the dialing information receiving registers R*eg*1 or R*eg*2. For this purpose the marker M*k* effects, in response to an energizing and identifying signal, a connection of the respective subscriber or of the incoming busy relay set RSa1 to RSa4 through the switching network KF to a free (nonbusy) dialing information receiving register Reg1 or Reg2. The dialing information receiving register Reg1 or Reg2 is connected to the memory device Spe by means of an auxiliary multiple switch HK2 after receipt of each cypher or numeral. The cypher is stored in the memory device Spe in accordance with the busy dialing information receiving register. When a number of cyphers sufficient for the connection through the switching network, is stored in the memory device Spe, then such cyphers are transferred to the marker Mk which after being connected to the network KF through an auxiliary multiple switch HK1, effects the connection through the network KF.

Where an internal connection is to be effected, the marker Mk connects the calling subscriber, for example T1, and the called subscriber, for example T4, to the input, for instance Eg1 and to the output, for instance Ag1, of an idle internal connecting set JVS1 via the following couplers:

T1, K111, K121, K131, K141, Eg1;
T4, K819, K821, K139, K149, Ag1.

The calling subscriber receives the ringing tones and the called subscriber station receives the ringing signal. If the called subscriber picks up his receiver, the connection is completed in the internal connection set.

The calling subscriber or the incoming busy relay set is also connected to a dialing information receiving register by means of the marker Mk for establishing outgoing external connections or through connections. If sufficient cyphers necessary for making a through connection are stored in the memory device Spe, the calling subscriber or the incoming busy relay set is interconnected through the network KF with a relay set, for example RS12, which is in turn connected to a line, for example L12 leading in the dialed traffic direction, for instance R1. A subscriber, such as T2, or an incoming busy relay set RSa2 is connected through the following multiple switches to a relay set, such as RS12, of a line having an outgoing traffic direction:

T2, or RSa2, K119, K129, K831, K841, RS12.

In a situation where such a connection cannot be made, because, for example, all intermediate lines between the switch K129 and the switch K831 are busy, then it is still possible to make a connection between the subscriber T2 and relay set RS12 as follows:

T2, K119, K121, K131, K149, ZWL51, K811, K829, K839, K841, RS12.

This illustrates the utilization of lines ZWL51 in the case of an overflow condition.

DESCRIPTION OF ALTERNATIVE EMBODIMENT

In FIG. 2 there is shown another embodiment of the invention, comprising an exchange network V. The network V comprises switches K111 to K349, which may be, for example, relay switches. The relay switches are arranged in four exchange switching stages KSt1 to KSt4. The switches of two switching stages are connected with each other by means of intermediate lines (unnumbered). The outputs of the fourth switching stage KSt4 are also connected in pairs with each other through intermediate lines (unnumbered). Of the total number of switches and intermediate lines only a few are shown in FIG. 2, these being sufficient to supply an understanding of the arrangement of the switching device V.

A plurality of subscribers T1 to Tn are connected to the inputs of the multiple of the first switching stage KSt1 through respective subscriber circuits TS1 to TSn. A plurality of connection lines or trunks L1 to Ln are connected to switch inputs through respective connection line repeaters or relay sets VL1 to VLn. A number of connecting sets VS1 to VSn, registers Re1 to Ren and ringing signal generators TG1 to TGn are also connected to the inputs of the switches of the first switching stage KSt1. The respective numbers of the just-mentioned circuit members depend upon individual requirements and need not be mentioned here. The registers Re1 to Ren are further connected through input and output lines m1 to mn and a connecting switch AK to a central marker M. A plurality of such markers may be provided. The marker(s) M are connected through marker lines ML to the switching network V. The operation of switches K111 to K349 is controlled through these markers lines ML.

The connections to the inputs of the multiple switch of the first switching stage KSt1 are made in a predetermined scheme. There is substantially less traffic on subscriber lines (T1 to Tn) than on any other circuit means connected to the inputs of the switches of the first switching stage KSt1. Therefore, according to the invention, the subscriber lines, connection lines, and all other circuit means shown, are connected to the inputs in a mixed fashion, in order to achieve a distribution of the traffic load to all multiple switches. It is further possible to substantially influence the average or mean traffic load of a switch by a respective selection and connection to such multiple switches of lines or other circuit means which are subject to a known small or large traffic load.

The registers Re1 to Ren are each connected to two inputs of two different switches. This feature increases the effective accessibility of the registers as compared to the other circuit means. As a result, the possibility that the few registers which are provided in common for making all connections, are not accessible, is substantially reduced. It is possible to connect these registers simultaneously and in parallel to more than two inputs of switches of the first switching stage whereby the effective accessibility is increased still more. Such parallel connections can also be employed for circuit means other than the registers.

OPERATION

For a better understanding of the arrangement according to the invention, several examples of establishing connections will now be described. In making connections between two subscribers, a subscriber, for instance T1, picks up his receiver whereby a register, such as Re1, is energized through the respective subscriber circuit in a manner not shown. The energized register identifies the calling subscriber circuit through a known type of identification device (not shown) and receives corresponding information. The register Re1 then actuates its own connection to the marker M through the connecting switch AK. The register Re1 then transfers the identification information to the marker M which, in response to such transfer, establishes (in a known manner) the through connection between the calling subscriber circuit TS1 and the register Re1 by means of path finding and path marking. For such a through connection, i.e., the following path can be ascertained or established:

TS1, K111, K121, K231, K241, K341, K331, K221, K211, Re1.

It is possible to select any one of several possible free paths because the through connection is established by means of path finding. Further, it is possible to establish a through connection by using less than 2 x 4 switching stages (KSt1 to Kst4; Kst4 to Kst1), as in the foregoing example. The through connection between the subscriber circuit TS1 and the register Re1 can be made via the switching stages KSt1 to KSt4. However, an intermediate line connecting the switches of the fourth coupling stage KSt4 with each other, may be omitted with the path as follows:

TS1, K111, K121, K131, K149, K139, K229, K211, Re1.

Accordingly, this connection is established by using but one switch K149 of the fourth switching stage KS$t$4. The outputs of switches K131 and K139 of the third switching stage KS$t$3, which are connected to inputs of switch K149 of the fourth switching stage, are connected with each other in the fourth switching stage by connecting such outputs in parallel to a free output, that is, to an intermediate line of the swtich in the fourth stage. Thus such an output is then busy and serves merely for interconnecting the two inputs connected in parallel thereto. It is possible to provide special blind outputs without intermediate lines for this purpose. This type of through connection in switch K149 of the fourth switching stage KS$t$4 is also referred to as a "short" connection.

Under certain circumstances no intermediate line is saved in the above described example; however, it saves a coupler in the fourth coupling stage. It is also possible to establish connections through less switching stages by providing such a "short" connection in the highest numbered switching stage participating in the connection. Thus, the subscriber circuit TS1 can be connected to register Re1, for example, through the following path:

TS1, K111, K129, K239, K229, K211, Re1.

In this example both switches of the fourth switching stage and one of the switching of the third coupling stage are not used, and hence are saved. It is possible to establish such a connection only through the first switching stage or through but a single coupler.

In the exchange network V of FIG. 2 some of the inputs of the switches of the first switching stage KS$t$1 are interconnected in pairs by bridges P1 and P2, such as disclosed in application, Ser. No. 537,980 filed on Mar. 28, 1966. A connection through such a bridge, for example between T1 to T$n$, takes the following path:

T1, TS1, K111, K121, K119, P1, K211, K229, K219, TS$n$, T$n$.

Such a connection may also take a different path twice through all four of the switching stages. Such connections through the bridges are established only when there is an overflow; that is, subscribers and other circuit means are only interconnected with each other through a bridge, such as P1, when there is no other free path.

In the above described path finding by the marker M, not only will there be selected a free path out of a plurality of such paths, but the marker will select the path which will assure the use of the least number of switching stages and switches for establishing the connection. Due to this path finding function of the marker, the higher numbered coupling stages, and particularly the last switching stage, are subject to lower traffic loads so that the last switching stage can be designed with regard to such lower loads. In this way it is possible to achieve a substantial saving of switches.

When the connection between the subscriber circuit TS1 and the register Re1 is established, the marker M automatically disconnects itself in order to control other connecting operations in the meantime. Thus, the connection through line M1 via connecting coupler AK is interrupted. The subscriber T1 receives from the register Re1 the dialing signal and now dials the number of the subscriber with whom he wants a connection, for example, the number of the subscriber T$n$. The register Re1 receives this number, and when the number is complete, the register Re1 again requests the marker M. If the marker is not busy it will again be connected to the register Re1 through connecting switch AK, and the register Re1 transmits the complete dialing information to the marker M. The marker M now performs, either simultaneously or sequentially, two path finding operations whereby a through connection can be made via four switching stages and eight switches, or in the manner described above via fewer switching stages and switches and, if necessary, also via a bridge, such as P1. The marker performs two path finding operations as mentioned and also two connecting operations whereby the desired connection between the subscriber T1 and the subscriber T$n$ comprises two partial connections. One partial connection exists between the subscriber T1 and a connecting set, for instance VS1 which prior thereto had been ascertained as idle and then marked busy by the marker. The other partial connection exists between said connecting set VS1 to the called subscriber T$n$. The complete connection between the two subscribers can be established through the following path which is the shortest possible in the embodiment shown in FIG. 2:

T1, TS1, K111, VS1, K211, K229, K219, Ts$n$, T$n$.

The connecting set VS1 comprises known circuits for supplying direct current to the subscriber stations, and further circuit means for additional known telephone communication functions such as for calling an operator, call interception, inquiries, transfer of calls to extension stations and similar functions. Where such special telephone communication functions are not needed, it is possible to establish a direct through connection between subscribers in the described manner by effecting the control through the register and marker, wherein the direct current supply of the subscriber stations and the monitoring of the release can be done by the subscriber circuits. For this purpose the subscriber circuits must be provided with a supply relay which will also operate as a release monitor. This will not involve any substantial additional expenditure. Such a direct through connection between subscriber T1 and the subscriber T$n$, for example, may be established via the following path which is the shortest possible in the embodiment shown in FIG. 2:

T1, TS1, K111, K121, K231, K221, K219, TS$n$, T$n$.

In comparing this connection with a connection via a connecting set and to partial connections each through 2 x 4 switching stages, it will be noted that the use of a total of 16 switches can be reduced, for example, to 5 switches.

The ringing signal generators TG1 to TG$n$ (FIG. 2) are well known and operate in the following manner. When a marker M receives the dialing information from a register, the marker will first ascertain whether the called subscriber is free. If the free condition is ascertained, the marker first makes two individual connections, that is, the first connection runs from the calling subscriber through the switching device to a ringing signal generator which emits a dialing signal or tone, and a second connection between the called subscriber and a ringing signal generator which emits a ringing signal, for example, alternating current. After establishing these two individual connections, the marker disconnects itself and is free (not busy) to be ready for other exchange purposes. When the called subscriber picks up his receiver, the marker M is again requested by register Re1. The marker again receives from the register the information relating to the calling and called subscriber and establishes a connection between the two subscribers either via a connecting set or via a direct through connection.

The connection line repeaters or relay sets, for example VL1 to VL$n$, may be connected in the same manner as the subscribers whereby through traffic is possible. In this connection there is the special advantage that the connection lines L1 to L$n$ are suitable for two way traffic, since two way traffic operation does not create any technical exchange and grouping difficulties for the device shown in FIG. 2. This is due to the fact that all switch means and circuit means are connected in the same manner to the switching network.

It is also possible in the above described manner to establish connections between subscribers and connection lines, for example T1 and L1, or between connection lines and registers, for instance for detour or reverse direction connections, or connections in any other desired combination.

Furthermore, it is possible to ascertain the traffic load of the switches by means of a traffic measuring device or by counting the connection attempts which fail. An equal distribution of the traffic loads of the different switching groups can be accomplished by giving preference in the path finding operation to the switches which are subject to the least load. This feature has particular significance in connection with the first switching stage, the switches of which have their inputs connected directly to subscribers which gives each switch a partial traffic load value which cannot be influenced by a proper path selection.

However, according to the invention, the partial traffic load value which the subscribers place on the switches is considered because the subscriber lines, the connection lines, the connection sets, the signal generators, the registers, and similar circuit means are connected in mixed fashion to the inputs of each multiple switch. Therefore, the sum of the partial traffic load value and the load value resulting from through connections to connection lines, connection sets, and so forth, is a load value which is substantially equalized for all switches. For this purpose the sequence in which the intermediate lines to the first switching stage are scanned may be varied in response to the traffic load of the switch of the first switching stage **KS*t*1** to which the intermediate lines connect.

It is to be understood that the invention is not limited to the particular embodiments and features described and shown but that it comprises any modification and equivalents within the scope of the appended claims.

I claim:

1. A circuit arrangement for communication systems, which comprises an exchange switching network (KF), a plurality of switching stages in said exchange switching network, each including switch means (K111 to K849), intermediate lines (ZWL11 to ZWL38 and ZWL2) for interconnecting the switching stages, input means and output means arranged in groups and subgroups in said exchange switching network, said switching stages and said intermediate lines being operable to interconnect any one of said input means with any one of said output means of the exchange switching network, said intermediate lines comprising lines for individually connecting the outputs of the switch means of each switching stage to the inputs of the switch means of the respective succeeding switching stage, circuit means (T1, **RS*a*1, T2, etc.) of several different types having different mean traffic loads connected to at least a portion of the input means of the exchange switching network, and further circuit means (RS11, E*g*1, R*eg*1**, etc.) of several different types having different mean traffic loads connected to at least a portion of the output means of the exchange switching network, said circuit means and said further circuit means being so connected to said respective input means and output means in mixed fashion as to traffic loads that the sums of the different traffic loads of the different switching systems connected to each of the groups or subgroups are equal among each other.

2. The circuit arrangement according to claim 1, wherein the ratio between said portion of connected input means and all input means is substantially equal to the ratio between the mean traffic load of the circuit means connected to such input means and the traffic load capacity of all input means to the switching network, and any extra input means are unconnected with the circuit means.

3. The circuit arrangement according to claim 1, wherein the ratio between said portion of connected output means and all output means is substantially equal to the ratio between the mean traffic load of the further circuit means connected to such output means and the traffic load capacity of all output means of the switching network, and any extra output means are unconnected with the circuit means.

4. The circuit arrangement according to claim 1, in which said circuit means and said further circuit means include one-way and two-way lines which are mixedly connected to the input means and output means.

5. The circuit arrangement according to claim 1, wherein all of said intermediate lines of the exchange switching field are adapted for handling two-way traffic.

References Cited

UNITED STATES PATENTS 1,681,221 8/1928 Coggins.

WILLIAM C. COOPER, Primary Examiner